US012725338B2

(12) United States Patent
Huang et al.

(10) Patent No.: US 12,725,338 B2
(45) Date of Patent: Sep. 1, 2026

(54) ARTIFICIAL INTELLIGENCE DEVICE FOR A DIGITAL AVATAR WITH 3D INTERACTION CAPABILITIES AND CONTROL METHOD THEREOF

(71) Applicant: LG ELECTRONICS INC., Seoul (KR)

(72) Inventors: Jinmiao Huang, Toronto (CA); Prashant Raina, Toronto (CA); Felix Taubner, Toronto (CA); Mathieu Tuli, Toronto (CA); Eu Wern Teh, Toronto (CA); Kevin Ferreira, Toronto (CA); Xiaoyu Yang, Toronto (CA)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 18/773,126

(22) Filed: Jul. 15, 2024

(65) Prior Publication Data

US 2025/0022200 A1 Jan. 16, 2025

Related U.S. Application Data

(60) Provisional application No. 63/526,493, filed on Jul. 13, 2023.

(51) Int. Cl.
*G06T 13/20* (2011.01)
*G06F 16/632* (2019.01)
(Continued)

(52) U.S. Cl.
CPC .......... *G06T 13/205* (2013.01); *G06F 16/632* (2019.01); *G06T 7/344* (2017.01);
(Continued)

(58) Field of Classification Search
None
See application file for complete search history.

(56) References Cited

U.S. PATENT DOCUMENTS 12,561,876 B2 * 2/2026 Obukhov .............. G06F 40/284

OTHER PUBLICATIONS

Alexanderson et al., Listen, Denoise, Action! Audio-Driven Motion Synthesis with Diffusion Models, May 16, 2023, 1-20 (Year: 2023).*

* cited by examiner

*Primary Examiner* — Robert J Craddock
(74) *Attorney, Agent, or Firm* — Birch, Stewart, Kolasch & Birch, LLP

(57) ABSTRACT

A method for controlling an artificial intelligence (AI) device for implementing a digital avatar can include receiving an audio signal corresponding to a user query, converting, by a speech-to-text neural network model, the audio signal into a text query, inputting the text query into a large language gesture instruction model to generate high level movement instructions, inputting the text query and the high level movement instructions into an information retrieval model to generate a text response including at least one sentence and digital avatar control information, and inputting the text response into a text-to-speech neural network model to generate an audio response. Also, the method can include inputting the audio response into an audio-to-facial animation model and an audio-to-conversational gesture model to generate updated digital avatar control information including gesture information, and outputting the audio response and the updated digital avatar control information for controlling the digital avatar.

20 Claims, 9 Drawing Sheets

(51) Int. Cl.

| | |
|---|---|
| ***G06T 7/33*** | (2017.01) |
| ***G06T 13/40*** | (2011.01) |
| ***G06T 17/20*** | (2006.01) |
| ***G10L 13/047*** | (2013.01) |
| ***G10L 15/16*** | (2006.01) |
| ***G10L 15/183*** | (2013.01) |

(52) U.S. Cl.

CPC .............. *G06T 13/40* (2013.01); *G06T 17/20* (2013.01); *G10L 13/047* (2013.01); *G10L 15/16* (2013.01); *G10L 15/183* (2013.01); *G06T 2207/10016* (2013.01); *G06T 2207/30201* (2013.01)

Figure 3:
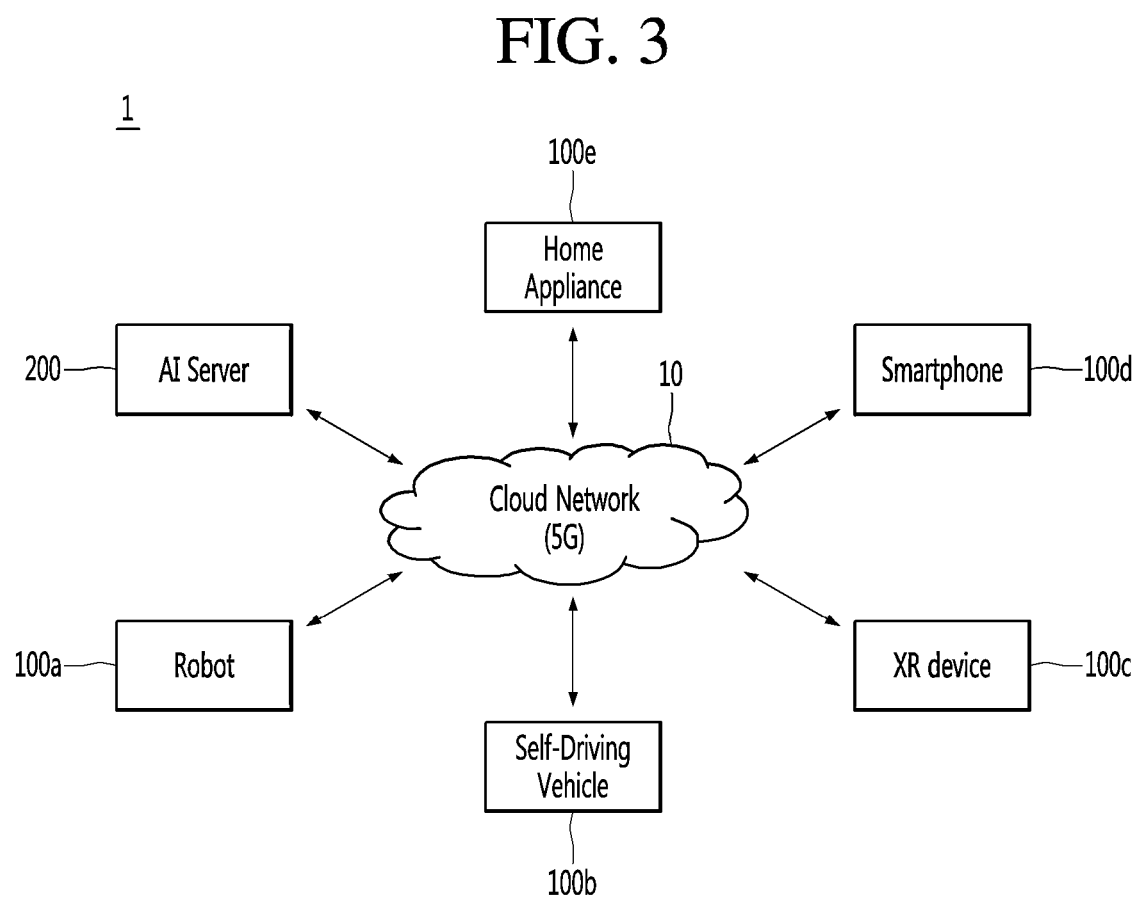

Home Appliance

200

AI Server

10

Smartphone

100d

Cloud Network (5G)

100a

Robot

XR device

100c

Self-Driving Vehicle

User: How frequently do I need to clean the filter of my air purifier?

Virtual Assistant: According to the maintenance instructions provided, the frequency of cleaning and filter replacement may vary depending on environment and usage time. However, it is recommended to clean the Ultra Fine Filter if it is contaminated, using a vacuum cleaner or a soft brush, at least once a year. Please note that failure to clean the product following the recommended schedule may result in it smelling bad or not working properly.

Relevant Information From Air Purifier Manual:

Maintaining the Appliance

Frequency of Cleaning and Filter Replacement

| Type | Cleaning frequency | Replacement cycle |
| --- | --- | --- |
| Filter | Ultra Fine Filter If it is contaminated, use a vacuum cleaner or a soft brush to clean it. | 1 year |

NOTE

- The operating environment and operation hours may affect the cleaning frequency. Clean more often if operating in a dusty environment.
- Failure to clean the product following the recommended schedule may result in it smelling bad or not working properly.

NOTE

- A slight odor may be emitted from the new filter at the beginning after purchase. The odor will disappear after a day or so of using the product, so you can use it without worry.
- The frequency of cleaning and filter replacement may vary depending on environment and usage time.
- Filters may be used for up to 1 year. The more polluted the indoor air, the shorter the life of the filter.

ARTIFICIAL INTELLIGENCE DEVICE FOR A DIGITAL AVATAR WITH 3D INTERACTION CAPABILITIES AND CONTROL METHOD THEREOF

CROSS-REFERENCE TO RELATED APPLICATIONS

This non-provisional application claims priority under 35 U.S.C. § 119(e) to U.S. Provisional Application No. 63/526,493, filed on Jul. 13, 2024, the entirety of which is hereby expressly incorporated by reference into the present application.

BACKGROUND

Field

The present disclosure relates to a device and method for controlling a digital avatar, in the field of artificial intelligence (AI). Particularly, the method can create and control a digital avatar with 3D interaction capabilities that can communicate with users, in the AI field.

Discussion of the Related Art

Artificial intelligence (AI) continues to transform various aspects of society and helps users more efficiently retrieve information and interact with digital environments, particularly with regards to digital avatars and question and answering systems.

A digital avatar is a virtual representation of a person or character, existing in digital spaces such as online games, virtual worlds, or social media. These avatars can range from simple 2D icons or profile pictures to complex, customizable 3D models that can interact with the environment and other users. Digital avatars can be used for various purposes, including entertainment, social interaction, communication, and even business applications such as customer service or virtual meetings.

Several digital avatar solutions have emerged in recent years, aiming to enhance the user experience and interaction in various domains. These solutions either provide pre-generated 2D video-based avatars (e.g., from artists) or have some capability to reconstruct avatars based on user input video. However, despite their impressive capabilities, these systems face limitations.

For example, existing avatar systems often lack 3D interaction with the surrounding environment and 3D objects, fail to provide sophisticated hand gesture recognition and interaction capabilities, and have limitations in reconstructing 3D faces and expressions.

Also, existing avatar systems do not generate facial animations without human or manual interaction, and fall short in their inability to initiate conversations based on specific domain knowledge.

Thus, a need exists for a device and method for controlling a digital avatar that can provide enhanced 3D interaction with the environment and objects, and provide natural gesture generation, which can bring a more authentic and engaging experience to virtual interactions.

Also, a need exists for overcoming limitations in 3D facial reconstruction, and an ability to more efficiently and realistically animate facial expressions directly from audio input.

In addition, there exists a need for the ability to empower domain-specific conversations that can allow a digital avatar to engage in meaningful and contextually relevant conversations, providing users with accurate information and valuable insights tailored to their specific needs, which can improve human-AI interactions and enhance user experiences.

SUMMARY OF THE DISCLOSURE

The present disclosure has been made in view of the above problems and it is an object of the present disclosure to provide a device and method that can provide a device and method for controlling a digital avatar, in the field of artificial intelligence (AI). Further, the method can provide for creation and control of a digital avatar with 3D interaction capabilities that can communicate with users based on domain-specific knowledge.

An object of the present disclosure is to provide artificial intelligence (AI) device configured to implement a digital avatar that can enhances user interaction with the digital environment by introducing 3D interaction and visual performative instruction capabilities, which allows users to explore and manipulate the virtual world more effectively, by having the avatar demonstrating instructions through intuitive 3D visuals, while also incorporating natural gesture generation, enabling users to express themselves more authentically during virtual interactions.

Another object of the present disclosure is to provide artificial intelligence (AI) device configured to implement a digital avatar that can overcome limitations in 3D facial reconstruction by utilizing more realistic representations of users using a 3D handheld phone cameras or webcams, which can employ advanced machine learning and audio analysis to animate facial expressions directly from audio input, creating dynamic and lifelike responses in avatars to spoken words or sounds.

Yet another object of the present disclosure is to provide artificial intelligence (AI) device configured to implement a digital avatar that can empower domain-specific conversations by leveraging specific industry or expertise knowledge, which can engage in meaningful and contextually relevant conversations, providing users with accurate information and tailored insights to meet their specific needs, enhancing visual and expressive capabilities, improving facial reconstruction, enabling realistic facial expressions from audio, and offering domain-specific conversations.

An object of the present disclosure is to provide a method for controlling an AI device that includes receiving, by a processor in the AI device, an audio signal corresponding to a user query, converting, by a speech-to-text neural network model, the audio signal into a text query, inputting the text query into a large language gesture instruction model to generate high level movement instructions for controlling a digital avatar to move or manipulate a 3D object, inputting the text query and the high level movement instructions into an information retrieval model to generate a text response including at least one sentence and digital avatar control information based on the high level movement instructions, inputting the text response into a text-to-speech neural network model to generate an audio response corresponding to the at least one sentence, inputting the audio response into an audio-to-facial animation model and an audio-to-conversational gesture model to generate updated digital avatar control information including gesture information, and outputting the audio response and the updated digital avatar control information for controlling the digital avatar.

Another object of the present disclosure is to provide a method, in which the updated digital avatar control information includes the high level movement instructions, hand gestures, and blendshape weights for animating a face of the digital avatar.

An object of the present disclosure is to provide a method that includes displaying the digital avatar on a display, and moving the digital avatar to carry out an animation sequence based on the updated digital avatar control information in synchronization with audio playback of the audio response.

Another object of the present disclosure is to provide a method that includes retrieving relevant documents based on the text query, generating an input prompt based on the text query, a prior conversation history between the user and the digital avatar, and the relevant documents, and inputting the input prompt into a retrieval-augmented large language model and outputting the text response by the retrieval-augmented large language model based on the input prompt.

Yet another object of the present disclosure is to provide a method that includes inputting the text query and a prior conversation history between the user and the digital avatar into a contextualizer large language model, to generate an updated standalone question by replacing at least one word in the text query with at least one word extracted from the prior conversation history.

An object of the present disclosure is to provide a method that includes performing a similarity search between the updated standalone question and a vector store to retrieve relevant documents from the vector store.

Another object of the present disclosure is to provide a method that includes generating an input prompt based on the text query, the prior conversation history, and the relevant documents from the vector store, and inputting the input prompt into a retrieval-augmented large language model and outputting the text response by the retrieval-augmented large language model based on the input prompt.

An object of the present disclosure is to provide a method that includes receiving one or more documents, dividing the one or more documents into a plurality of segments, generating embeddings for the plurality of segments using an encoder, storing the one or more documents and the embeddings in a vector store for creating a searchable index.

Yet another object of the present disclosure is to provide a method, in which the one or more documents include a product manual, an instruction manual or a user manual.

An object of the present disclosure is to provide a method that includes receiving a video including a face of the user, generating a 3D face mesh based on the video and a learned 3D morphable face model, and animating a face of the digital avatar based on the 3D face mesh.

Another object of the present disclosure is to provide a method, in which the generating the 3D face mesh includes aligning parts of the learned 3D morphable face model with parts of frame images from the video.

An object of the present disclosure is to provide an artificial intelligence (AI) device for controlling a digital avatar that includes a memory configured to store information for controlling a digital avatar, and a controller configured to receive an audio signal corresponding to a user query, convert, by a speech-to-text neural network model, the audio signal into a text query, input the text query into a large language gesture instruction model to generate high level movement instructions for controlling a digital avatar to move or manipulate a 3D object, input the text query and the high level movement instructions into an information retrieval model to generate a text response including at least one sentence and digital avatar control information based on the high level movement instructions, input the text response into a text-to-speech neural network model to generate an audio response corresponding to the at least one sentence, input the audio response into an audio-to-facial animation model and an audio-to-conversational gesture model to generate updated digital avatar control information including gesture information, and output the audio response and the updated digital avatar control information for controlling the digital avatar.

In addition to the objects of the present disclosure as mentioned above, additional objects and features of the present disclosure will be clearly understood by those skilled in the art from the following description of the present disclosure.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, which are briefly described below.

FIG. 3 illustrates an AI device according to an embodiment of the present disclosure.

FIG. 9 shows an example output of the digital avatar assistant, according to an embodiment of the present disclosure.

DETAILED DESCRIPTION OF THE EMBODIMENTS

Figure 1:
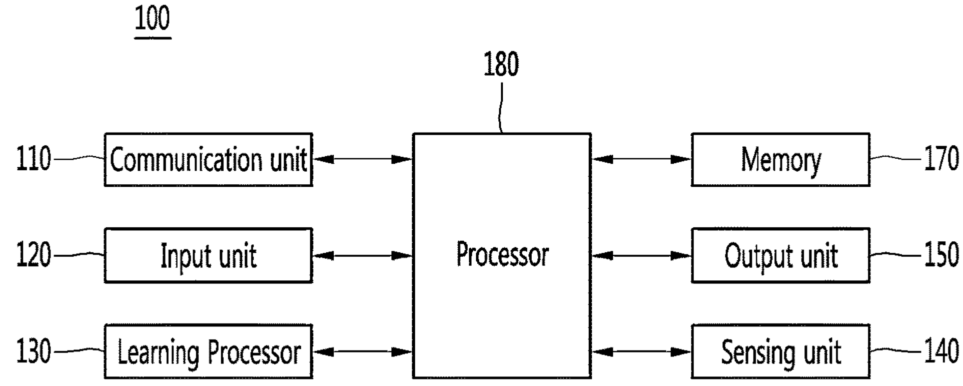
FIG. 1 illustrates an AI device according to an embodiment of the present disclosure.

Reference will now be made in detail to the embodiments of the present disclosure, examples of which are illustrated in the accompanying drawings.

Wherever possible, the same reference numbers will be used throughout the drawings to refer to the same or like parts.

Advantages and features of the present disclosure, and implementation methods thereof will be clarified through following embodiments described with reference to the accompanying drawings.

The present disclosure can, however, be embodied in different forms and should not be construed as limited to the embodiments set forth herein.

Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details.

Like reference numerals refer to like elements throughout. In the following description, when the detailed description of the relevant known function or configuration is determined to unnecessarily obscure the important point of the present disclosure, the detailed description will be omitted.

In a situation where "comprise," "have," and "include" described in the present specification are used, another part can be added unless "only" is used. The terms of a singular form can include plural forms unless referred to the contrary.

In construing an element, the element is construed as including an error range although there is no explicit description. In describing a position relationship, for example, when a position relation between two parts is described as "on," "over," "under," and "next," one or more other parts can be disposed between the two parts unless 'just' or 'direct' is used.

In describing a temporal relationship, for example, when the temporal order is described as "after," "subsequent," "next," and "before," a situation which is not continuous can be included, unless "just" or "direct" is used.

It will be understood that, although the terms "first," "second," etc. can be used herein to describe various elements, these elements should not be limited by these terms.

These terms are only used to distinguish one element from another. For example, a first element could be termed a second element, and, similarly, a second element could be termed a first element, without departing from the scope of the present disclosure.

Further, "X-axis direction," "Y-axis direction" and "Z-axis direction" should not be construed by a geometric relation only of a mutual vertical relation and can have broader directionality within the range that elements of the present disclosure can act functionally.

The term "at least one" should be understood as including any and all combinations of one or more of the associated listed items.

For example, the meaning of "at least one of a first item, a second item and a third item" denotes the combination of all items proposed from two or more of the first item, the second item and the third item as well as the first item, the second item or the third item.

Features of various embodiments of the present disclosure can be partially or overall coupled to or combined with each other and can be variously inter-operated with each other and driven technically as those skilled in the art can sufficiently understand. The embodiments of the present disclosure can be carried out independently from each other or can be carried out together in co-dependent relationship.

Hereinafter, the preferred embodiments of the present disclosure will be described in detail with reference to the accompanying drawings. All the components of each device or apparatus according to all embodiments of the present disclosure are operatively coupled and configured.

Artificial intelligence (AI) refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and can mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network can include an input layer, an output layer, and optionally one or more hidden layers. Each layer includes one or more neurons, and the artificial neural network can include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method.

The supervised learning can refer to a method of learning an artificial neural network in a state in which a label for learning data is given, and the label can mean the correct answer (or result value) that the artificial neural network must infer when the learning data is input to the artificial neural network. The unsupervised learning can refer to a method of learning an artificial neural network in a state in which a label for learning data is not given. The reinforcement learning can refer to a learning method in which an agent defined in a certain environment learns to select a behavior or a behavior sequence that maximizes cumulative compensation in each state.

Machine learning, which can be implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving can include a technology for maintaining a lane while driving, a technology for automatically adjusting a speed, such as adaptive cruise control, a technique for automatically traveling along a predetermined route, and a technology for automatically setting and traveling a route when a destination is set.

The vehicle can include a vehicle having only an internal combustion engine, a hybrid vehicle having an internal combustion engine and an electric motor together, and an electric vehicle having only an electric motor, and can include not only an automobile but also a train, a motorcycle, and the like.

At this time, the self-driving vehicle can be regarded as a robot having a self-driving function.

FIG. 1 illustrates an artificial intelligence (AI) device 100 according to one embodiment.

The AI device 100 can be implemented by a stationary device or a mobile device, such as a television (TV), a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, home appliances and the like. However, other variations are possible.

Referring to FIG. 1, the AI device 100 can include a communication unit 110 (e.g., transceiver), an input unit 120 (e.g., touchscreen, keyboard, mouse, microphone, etc.), a learning processor 130, a sensing unit 140 (e.g., one or more sensors or one or more cameras), an output unit 150 (e.g., a display or speaker), a memory 170, and a processor 180 (e.g., a controller).

The communication unit 110 (e.g., communication interface or transceiver) can transmit and receive data to and from external devices such as other AI devices 100*a* to 100*e* and the AI server 200 (e.g., FIGS. 2 and 3) by using wire/wireless communication technology. For example, the communication unit 110 can transmit and receive sensor information, a user input, a learning model, and a control signal to and from external devices.

The communication technology used by the communication unit 110 can include GSM (Global System for Mobile communication), CDMA (Code Division Multi Access), LTE (Long Term Evolution), 5G, WLAN (Wireless LAN), Wi-Fi (Wireless-Fidelity), BLUETOOTH, RFID (Radio Frequency Identification), Infrared Data Association (IrDA), ZIGBEE, NFC (Near Field Communication), and the like.

The input unit 120 can acquire various kinds of data.

At this time, the input unit 120 can include a camera for inputting a video signal, a microphone for receiving an audio signal, and a user input unit for receiving information from a user. The camera or the microphone can be treated as a sensor, and the signal acquired from the camera or the microphone can be referred to as sensing data or sensor information.

The input unit 120 can acquire a learning data for model learning and an input data to be used when an output is acquired by using a learning model. The input unit 120 can acquire raw input data. In this situation, the processor 180 or the learning processor 130 can extract an input feature by preprocessing the input data.

The learning processor 130 can learn a model composed of an artificial neural network by using learning data. The learned artificial neural network can be referred to as a learning model. The learning model can be used to infer a result value for new input data rather than learning data, and the inferred value can be used as a basis for determination to perform a certain operation.

Also, the learning processor 130 can perform AI processing together with the learning processor 240 of the AI server 200.

In addition, the learning processor 130 can include a memory integrated or implemented in the AI device 100. Alternatively, the learning processor 130 can be implemented by using the memory 170, an external memory directly connected to the AI device 100, or a memory held in an external device.

The sensing unit 140 can acquire at least one of internal information about the AI device 100, ambient environment information about the AI device 100, and user information by using various sensors.

Examples of the sensors included in the sensing unit 140 can include a proximity sensor, an illuminance sensor, an acceleration sensor, a magnetic sensor, a gyro sensor, an inertial sensor, an RGB sensor, an IR (infrared) sensor, a fingerprint recognition sensor, an ultrasonic sensor, an optical sensor, a camera, a microphone, a lidar, and a radar.

The output unit 150 can generate an output related to a visual sense, an auditory sense, or a haptic sense.

Also, the output unit 150 can include a display unit for outputting time information, a speaker for outputting auditory information, and a haptic module for outputting haptic information.

The memory 170 can store data that supports various functions of the AI device 100. For example, the memory 170 can store input data acquired by the input unit 120, learning data, a learning model, a learning history, and the like.

The processor 180 can determine at least one executable operation of the AI device 100 based on information determined or generated by using a data analysis algorithm or a machine learning algorithm. The processor 180 can control the components of the AI device 100 to execute the determined operation. For example, the processor 180 can receive a face mesh and interact with a user to engage in conversations. Also, processor 180 can answer questions from the user and provide step by step instructions for how to use or service a product, which can be based on product manual information.

To this end, the processor 180 can request, search, receive, or utilize data of the learning processor 130 or the memory 170. The processor 180 can control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device.

The processor 180 can acquire information for the user input and can determine an answer or a recommended item or action based on the acquired intention information.

The processor 180 can acquire the information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, can be learned by the learning processor 240 of the AI server 200 (see FIG. 2), or can be learned by their distributed processing.

The processor 180 can collect history information including user profile information, the operation contents of the AI device 100 or the user's feedback on the operation and can store the collected history information in the memory 170 or the learning processor 130 or transmit the collected history information to the external device such as the AI server 200. The collected history information can be used to update the learning model.

The processor 180 can control at least part of the components of AI device 100 to drive an application program stored in memory 170. Furthermore, the processor 180 can operate two or more of the components included in the AI device 100 in combination to drive the application program.

Figure 2:
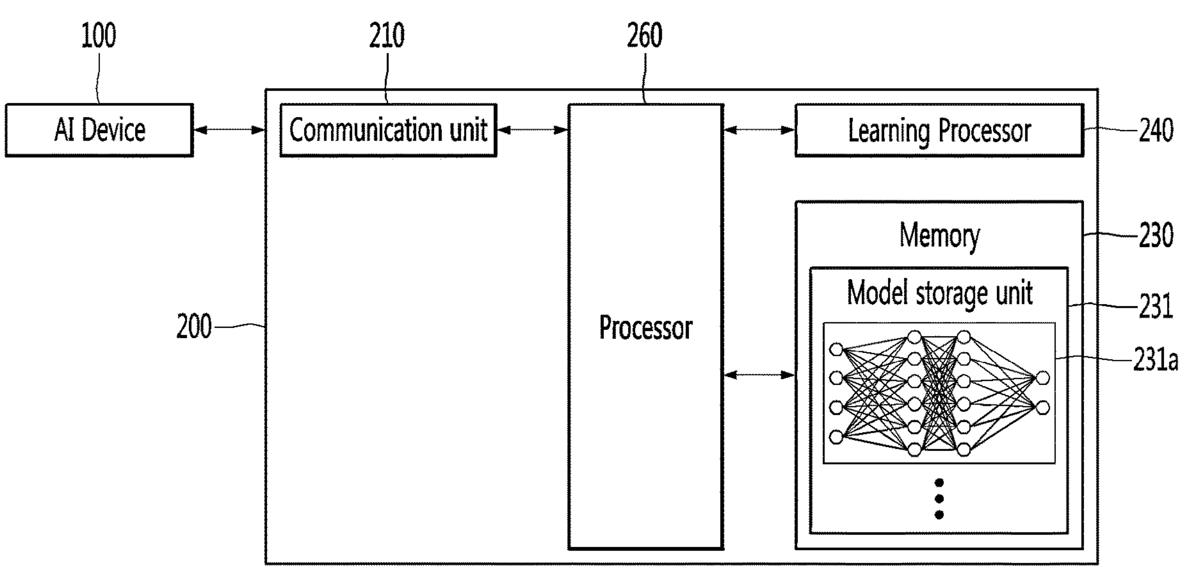
FIG. 2 illustrates an AI server according to an embodiment of the present disclosure.

FIG. 2 illustrates an AI server according to one embodiment.

Referring to FIG. 2, the AI server 200 can refer to a device that learns an artificial neural network by using a machine learning algorithm or uses a learned artificial neural network. The AI server 200 can include a plurality of servers to perform distributed processing, or can be defined as a 5G network, 6G network or other communications network. At this time, the AI server 200 can be included as a partial configuration of the AI device 100, and can perform at least part of the AI processing together.

The AI server 200 can include a communication unit 210, a memory 230, a learning processor 240, a processor 260, and the like.

The communication unit 210 can transmit and receive data to and from an external device such as the AI device 100.

The memory 230 can include a model storage unit 231. The model storage unit 231 can store a learning or learned model (or an artificial neural network 231*a*) through the learning processor 240.

The learning processor 240 can learn the artificial neural network 231*a* by using the learning data. The learning model can be used in a state of being mounted on the AI server 200 of the artificial neural network, or can be used in a state of being mounted on an external device such as the AI device 100.

The learning model can be implemented in hardware, software, or a combination of hardware and software. If all or part of the learning models are implemented in software, one or more instructions that constitute the learning model can be stored in the memory 230.

The processor 260 can infer the result value for new input data by using the learning model and can generate a response or a control command based on the inferred result value. Also, the processor 260 can receive audio inputs from the terminal device and generate a response along with gesture control information to send to the terminal device.

FIG. 3 illustrates an AI system 1 including a terminal device according to one embodiment.

Referring to FIG. 3, in the AI system 1, at least one of an AI server 200, a robot 100*a*, a self-driving vehicle 100*b*, an XR (extended reality) device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, can be referred to as AI devices 100*a* to 100*e*. The AI server 200 of FIG. 3 can have the configuration of the AI server 200 of FIG. 2.

According to an embodiment, the evaluation method can be implemented as an application or program that can be downloaded or installed in the smartphone 100*d* or the home appliance 100*e*, which can communicate with the AI server 200, but embodiments are not limited thereto.

The cloud network 10 can refer to a network that forms part of a cloud computing infrastructure or exists in a cloud computing infrastructure. The cloud network 10 can be configured by using a 3G network, a 4G or LTE network, a 5G network, a 6G network, or other network.

For instance, the devices 100*a* to 100*e* and 200 configuring the AI system 1 can be connected to each other through the cloud network 10. In particular, each of the devices 100*a* to 100*e* and 200 can communicate with each other through a base station, but can directly communicate with each other without using a base station.

The AI server 200 can include a server that performs AI processing and a server that performs operations on big data.

The AI server 200 can be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and can assist at least part of AI processing of the connected AI devices 100*a* to 100*e*.

In addition, the AI server 200 can learn the artificial neural network according to the machine learning algorithm instead of the AI devices 100*a* to 100*e*, and can directly store the learning model or transmit the learning model to the AI devices 100*a* to 100*e*.

The AI device 100 can obtain a knowledge graph, which can include a web of interconnected facts and entities (e.g., a web of knowledge). A knowledge graph is a structured way to store and represent information, capturing relationships between entities and concepts in a way that machines can understand and reason with.

According to an embodiment, the AI device 100 and the AI server 200 can include one or more knowledge graphs that include entities and properties or information about people or items (e.g., names, user IDs), products (e.g., display devices, home appliances, etc.), profile information (e.g., age, gender, weight, location, etc.), recipe categories, ingredients, images, purchases and reviews.

According to an embodiment, a knowledge graph can capture real world knowledge in the form of a graph structure modeled as (h, r, t) triplets where h and t refer to a head entity and a tail entity respectively, and r is a relationship that connects the two entities.

Also, knowledge graph completion can refer to a process of filling in missing information in a knowledge graph, making it more comprehensive and accurate (e.g., similar to piecing together a puzzle, uncovering hidden connections and expanding the knowledge base). Link prediction can identify missing links in a knowledge graph (KG) and assist with downstream tasks such as question answering and recommendation systems.

Also, the AI server 200 can receive input data from the AI devices 100*a* to 100*e*, can infer the result value for the received input data by using the learning model, can generate a response or a control command based on the inferred result value, and can transmit the response or the control command to the AI devices 100*a* to 100*e*. Each AI device 100*a* to 100*e* can have the configuration of the AI device 100 of FIGS. 1 and 2 or other suitable configurations.

Alternatively, the AI devices 100*a* to 100*e* can infer the result value for the input data by directly using the learning model, and can generate the response or the control command based on the inference result.

Hereinafter, various embodiments of the AI devices 100*a* to 100*e* to which the above-described technology is applied will be described. The AI devices 100*a* to 100*e* illustrated in FIG. 3 can be regarded as a specific embodiment of the AI device 100 illustrated in FIG. 1.

According to an embodiment, the home appliance 100*e* can be a smart television (TV), smart microwave, smart oven, a smart washing machine, smart refrigerator or other display device, which can implement one or more of an evaluation method, a question and answering system or a recommendation system. The method can be the form of an executable application or program.

The robot 100*a*, to which the AI technology is applied, can be implemented as an entertainment robot, a guide robot, a carrying robot, a cleaning robot, a wearable robot, a pet robot, an unmanned flying robot, or the like.

The robot 100*a* can include a robot control module for controlling the operation, and the robot control module can refer to a software module or a chip implementing the software module by hardware.

The robot 100*a* can acquire state information about the robot 100*a* by using sensor information acquired from various kinds of sensors, can detect (recognize) surrounding environment and objects, can generate map data, can determine the route and the travel plan, can determine the response to user interaction, or can determine the operation.

The robot 100*a* can use the sensor information acquired from at least one sensor among the lidar, the radar, and the camera to determine the travel route and the travel plan.

The robot 100*a* can perform the above-described operations by using the learning model composed of at least one artificial neural network. For example, the robot 100*a* can recognize the surrounding environment and the objects by using the learning model, and can determine the operation by using the recognized surrounding information or object information. The learning model can be learned directly from the robot 100*a* or can be learned from an external device such as the AI server 200.

In addition, the robot 100*a* can perform the operation by generating the result by directly using the learning model, but the sensor information can be transmitted to the external device such as the AI server 200 and the generated result can be received to perform the operation.

The robot 100*a* can use at least one of the map data, the object information detected from the sensor information, or the object information acquired from the external apparatus to determine the travel route and the travel plan, and can control the driving unit such that the robot 100*a* travels along the determined travel route and travel plan. Further, the robot 100*a* can determine an action to pursue or an item to recommend. Also, the robot 100*a* can generate an answer in response to a user query. The answer can be in the form of natural language.

The map data can include object identification information about various objects arranged in the space in which the robot 100*a* moves. For example, the map data can include object identification information about fixed objects such as walls and doors and movable objects such as pollen and desks. The object identification information can include a name, a type, a distance, and a position.

In addition, the robot 100*a* can perform the operation or travel by controlling the driving unit based on the control/interaction of the user. At this time, the robot 100*a* can acquire the intention information of the interaction due to the user's operation or speech utterance, and can determine the response based on the acquired intention information, and can perform the operation.

The robot 100*a*, to which the AI technology and the self-driving technology are applied, can be implemented as a guide robot, a carrying robot, a cleaning robot (e.g., an automated vacuum cleaner), a wearable robot, an entertainment robot, a pet robot, an unmanned flying robot (e.g., a drone or quadcopter), or the like.

The robot 100*a*, to which the AI technology and the self-driving technology are applied, can refer to the robot itself having the self-driving function or the robot 100*a* interacting with the self-driving vehicle 100*b*.

The robot 100*a* having the self-driving function can collectively refer to a device that moves for itself along the given movement line without the user's control or moves for itself by determining the movement line by itself.

The robot 100*a* and the self-driving vehicle 100*b* having the self-driving function can use a common sensing method to determine at least one of the travel route or the travel plan. For example, the robot 100*a* and the self-driving vehicle 100*b* having the self-driving function can determine at least one of the travel route or the travel plan by using the information sensed through the lidar, the radar, and the camera.

The robot 100*a* that interacts with the self-driving vehicle 100*b* exists separately from the self-driving vehicle 100*b* and can perform operations interworking with the self-driving function of the self-driving vehicle 100*b* or interworking with the user who rides on the self-driving vehicle 100*b*.

In addition, the robot 100*a* interacting with the self-driving vehicle 100*b* can control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* can monitor the user boarding the self-driving vehicle 100*b*, or can control the function of the self-driving vehicle 100*b* through the interaction with the user. For example, when it is determined that the driver is in a drowsy state, the robot 100*a* can activate the self-driving function of the self-driving vehicle 100*b* or assist the control of the driving unit of the self-driving vehicle 100*b*. The function of the self-driving vehicle 100*b* controlled by the robot 100*a* can include not only the self-driving function but also the function provided by the navigation system or the audio system provided in the self-driving vehicle 100*b*.

Alternatively, the robot 100*a* that interacts with the self-driving vehicle 100*b* can provide information or assist the function to the self-driving vehicle 100*b* outside the self-driving vehicle 100*b*. For example, the robot 100*a* can provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

According to another embodiment, the AI device 100 can be integrated into an infotainment system of the self-driving vehicle 100*b*, which can recommend content or provide answers based on various input modalities, the content can include one or more of audio recordings, video, music, pod casts, etc., but embodiments are not limited thereto. Also, the AI device 100 can be integrated into an infotainment system of the manual or human-driving vehicle.

According to an embodiment, the AI device 100 can provide a digital avatar that can communicate with users, answer questions and provide services, such as product support. For example, the digital avatar is an interactive and intelligent virtual entity that can engage in lifelike conversations, convey emotions, and adapt its responses in real-time.

According to an embodiment, the AI device 100 implementing the digital avatar can enhance 3D interaction, incorporate natural gestures, overcome limitations in facial reconstruction and animation, and empower domain-specific conversations. In this way, a more immersive, realistic and tailored virtual experience can be provided to improve the way users interact with digital environments and avatars.

Several digital avatar solutions have emerged in recent years, aiming to enhance the user experience and interaction in various domains (e.g., UneeQ, Synthesia, and Nvidia's Live Portrait). However, existing solutions have various shortcomings and face several limitations.

These existing solutions often rely on a pre-generated 2D video-based avatar (from artists), which can restrict their ability to interact with the surrounding environment, and lack the contextual capability to engage seamlessly with real-world settings. This limitation becomes particularly apparent in scenarios where digital avatars are tasked with product sales or customer support in the context of appliances.

For example, a user may seek guidance on how to change a filter on an air purifier. In such a situation, the avatar's interaction with 3D objects becomes increasingly significant. According to an embodiment, the AI device 100 implementing the digital avatar can demonstrate the step-by-step sequence of actions (e.g., changing the filter) while physically interacting with a virtual representation of the air purifier (e.g., or other product) in the same immersive environment. This can provide considerable value to users by providing a digital avatar with the capability of presenting a visual and interactive guide that bridges the gap between virtual and physical experiences.

According to an embodiment, the AI device 100 implementing the digital avatar can include capabilities that encompass interactions with 3D objects and integrate them seamlessly into virtual environments, which can provide enhanced engagement and practical utilization. The AI device 100 implementing the digital avatar can provide users with hands-on guidance and demonstrations, facilitating a more intuitive and immersive experience that is not constrained by the limitations of traditional video-based representations.

In other words, rather than merely reading instructions from a product manual, a user can watch how the digital avatar physically handles and services the product while also providing step-by-step explanations during the process. Also, the presentation and interaction can be viewed from different angles by the user.

In addition, existing avatar solutions often primarily focus on facial representation, while neglecting the importance of hand gesture interactions. For example, hand gestures can be integral to human communication, conveying nuanced meaning, detailed directions and enhancing expressiveness. Thus, in order to provide a more comprehensive and authentic user experience, according to an embodiment, the AI device 100 implementing the digital avatar can incorporate sophisticated hand gesture recognition and interaction capabilities.

Also, existing digital avatars often lack the capability to reconstruct photorealistic 3D faces having personalization, or at least require significant, manual inputs from a human operator and have limitations regarding facial expression animation. For instance, Unreal Engine's Metahuman requires animating 3D faces using specialized facial capture devices and relies on pre-made faces, which lacks the ability to generate facial animations without human interaction.

Similarly, Nvidia's omniverse audio2face pipeline requires manual retargeting when swapping a character or changing a face for an avatar, which is a cumbersome and time-consuming process.

Another area where existing solutions fall short is their inability to initiate conversations based on specific domain knowledge. While these systems could use a large language model such as ChatGPT to enable a natural conversation, they lack the intelligence to engage in meaningful dialogue based on specific contextual information.

According to an embodiment, the AI device 100 implementing the digital avatar can incorporate domain-specific knowledge such as user manuals or new products to revolutionize the way avatars are utilized in customer service, education, and various other industries, in order to provide tailored and knowledgeable assistance to users.

According to an embodiment, the AI device 100 implementing the digital avatar can be provide avatar-based sales representatives and customer support, and can be incorporated into smart TVs and smart home appliances for seamless day-to-day interaction with digital avatars, revolutionizing the user experience.

Figure 4:
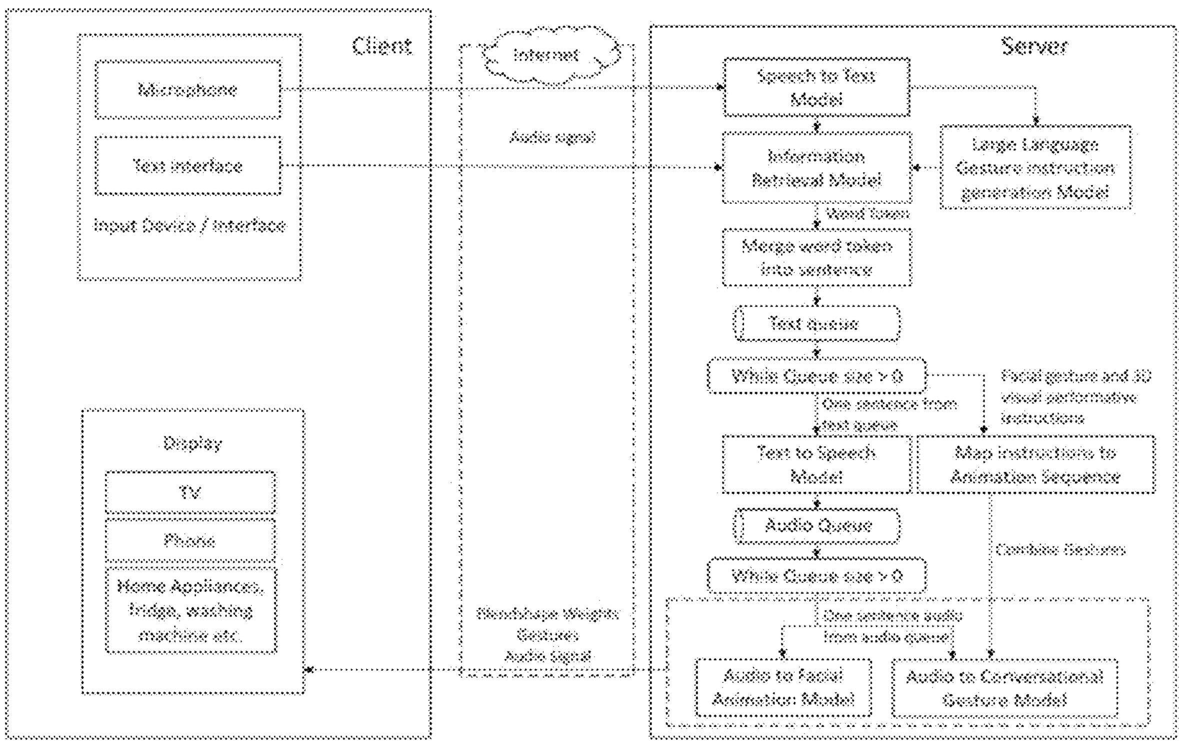
FIG. 4 illustrates a digital avatar system according to an embodiment of the present disclosure.

FIG. 4 illustrates a digital avatar system according to an embodiment of the present disclosure. The system can include a client device (e.g., AI device 100) and a server (e.g., AI server 200). The system can provide low-latency communication between users and digital avatars.

According to an embodiment, a user can select from among pre-made avatars or create their own personalized avatar. If a user chooses to create an avatar, the user can be prompted to provide a short video that captures his or her face from left to right (e.g., discussed in more detailed below with regards to FIG. 10). The face reconstruction model can be located on the server side. After the face is generated by the server, a face mesh can be sent to the user's client device (e.g., an edge device, such as a smart TV or mobile phone). Then, the user can engage in conversations with their personalized avatar.

In addition, the system can allow a user to communicate with the digital avatar using a microphone in the client device, and the avatar can respond with contextually appropriate speech, facial animations and gestures. Alternatively, the user to communicate with the digital avatar via text inputs and messages.

Further, the digital avatar system can implement a speech-to-text neural network model to convert the user's speech into text. According to an embodiment, the speech-to-text neural network model can be located on the server. Alternatively, the speech-to-text neural network model can be located within the client device.

The user's text input can be input to an information retrieval model which can be powered by a large language model which generates text responses to the user's specific questions, which can be product related (e.g., discussed in more detail below with regards to FIG. 6).

Then, the generated text response can be processed using a text-to-speech neural network model to convert the text response into an audio format. According to an embodiment, the text-to-speech neural network model can be located on the server. Alternatively, the text-to-speech neural network model can be located within the client device.

According to an embodiment, the generated audio response can then be utilized in an audio-to-facial animation generation pipeline to generate synchronized face animations for the avatar, and simultaneously, the audio can be played back within the digital avatar environment. In other words, the avatar's face and mouth movements can be generated directly from an audio sentence generated for the response.

In addition, the avatar system can use a large language model to optimize the generation of gesture instructions, covering a wide range of micro facial expressions. These types of expressions can include one or more of eye blinking, smiling, raising or lowering eyebrows and frowning, which can result in more nuanced and lifelike gestures. Moreover, the large language model can generate dynamic 3D visual performative instruction gestures, such as pointing and grabbing (e.g., pointing to specific part on a product, rotating a 3D object by a certain amount, opening or manipulating a portion of a 3D object, etc.). For example, the user can watch the avatar physically change an air filter on an air purifier.

The 3D visual performative instruction gestures can be mapped into a pre-animated sequence to control the digital avatar. Also, according to an embodiment, the audio response, the corresponding facial movements, and the corresponding 3D visual performative instruction gestures can be chunked or parsed on a per sentence basis and transmitted to the client device and executed by the digital avatar one sentence at a time. In this way, latency and buffering can be improved, costs can be reduced, and a comprehensive and immersive communication experience can be provided to the user.

According to embodiments, all of the neural network models can reside on the server side (e.g., AI sever 200), but embodiments are not limited thereto. For example, according to another embodiment, one or more of the neural network models (or all) can reside on the client side (e.g., AI device 100). According to an embodiment, the client device and the server can be collectively referred to as an AI device.

In addition, when the neural network models are included in the server, a communication connection (e.g., TCP) can be established with the client device to transfer data. Also, the generated answer and corresponding movements and gestures can be chunked into sentences, treating each sentence as an individual element in a buffer system, in order to reduce latency.

For example, sentence-level chunking can effectively maintain continuity in generating speech from text and generating facial and gesture animations from audio. In more detail, according to an embodiment, as soon as the first audio sentence and its corresponding facial animations and gestures are generated, the digital avatar can begin to respond to the user. For example, the system can operate asynchronously, allowing the buffer to queue subsequent sentences from the ongoing conversation.

In addition, the digital avatar system can carry out conversational question answering (CQA) which involves modeling the information seeking process of humans in a dialogue. CQA is a multi-turn question and answer task, where questions in a dialogue are context-dependent and should be understood within the conversation history.

According to an embodiment, the digital avatar system can provide a virtual manual assistant capable of coherent dialogues with the user to aid in various tasks, such as troubleshooting or providing instructions according to product manuals. In this way, the user experience can be enhanced by providing immediate, personalized, and accurate response to queries. For example customer service can be improved and costs can be reduced by allowing human customer service representatives to be able to focus on more complex and unique issues.

According to embodiments, the digital avatar system can employ an end-to-end approach or a pipeline approach to CQA. The end-to-end approach can include employing a single question answering model that simultaneously encodes the evidence document (e.g., a product manual), the current question, and the entire conversation history.

According to a preferred embodiment, the digital avatar system can employ a pipeline approach that includes decomposing the CQA task into question rewriting (QR) and question answering (QA), in order to reduce the task's complexity and improve accuracy. After rewriting the question as a self-contained question, the digital avatar system can use a QA model to answer the self-contained question rather than the original user question.

According to an embodiment, the digital avatar system can accurately respond to user queries in a conversational context by leveraging evidence documents (e.g., such as product manuals) as its knowledge base, and understand the intent of the user within the conversation context, generate plausible long-form answers and provide low-latency. To achieve these advantages, the digital avatar system can utilize retrieval-augmented LLMs for CQA, which can resolve conversational dependencies and perform in-context learning.

For example, the digital avatar system can construct a prompt composed of the evidence documents, the current question, and the conversation history to guide the model's generation. For example, carrying out the question rewriting (QR) task can include converting the original question into a self-contained question which can be used to select more relevant evidence passages, which is discussed in more detail below with regards to FIGS. 6 and 7.

In more detail, as shown in FIG. 4, a user can ask a question to the digital avatar and a microphone in the client device can record the audio signal and transmit the audio signal to the server. Alternatively, the user can input the question as a text message and the text message can be sent to the server.

Upon receiving the audio signal from the client device, a speech-to-text neural network model can convert the audio signal into text, and supply the text to both of an information retrieval model and a large language gesture instruction model.

The large language gesture instruction model can take the text (e.g., corresponding to the user's query) and output gesture and movement instructions, and supply the instructions to the information retrieval model. For example, the gesture instructions can be high level instructions that can include movement instructions based on the converted text from the input query, such as "cause the avatar to look here," "point with finger here," "carry 3D object from location X to location Y," "rotate 3D object by N degrees" etc.

Upon receiving the text (e.g., corresponding to the user's query) and the gesture and movement instructions from the large language gesture instruction model, the information retrieval model can output word tokens (e.g., one at a time) and send the tokens to a text sentence buffering module. For example, the information retrieval model can output a response that includes a text answer and movement instructions for the avatar (e.g., conditioned on gestures). The information retrieval model is discussed in more detailed below with regards to FIG. 6. According to an embodiment, the large language gesture instruction model can include a neural network and be based on a transformer based architecture (e.g., such as GPT-3.5-turbo), but embodiments are not limited thereto.

Then, the text sentence buffering module can group the tokens output from the information retrieval model into complete sentences. While the queue size in the text sentence buffering module is greater than zero (e.g., # of sentences>0), the text sentence buffering module can supply sentences, one at a time, to both of the text-to-speech neural network model and an animation mapping module.

The text-to-speech neural network model can convert each text sentence into a corresponding audio signal and supply it to an audio buffering module. While the queue size in the audio buffering module is greater than zero (e.g., # of audio sentences>0), the audio buffering module can supply audio sentences, one at a time, to both of an audio to facial animation model and an audio to conversational gesture module.

In addition, upon receiving the text sentence from the text sentence buffering module, the animation mapping module can map instructions to an animation sequence. For example, facial gestures and 3D visual performative instructions can be mapped together. Accordingly, high level instructions generated by the large language gesture instruction model can be provided including movement instructions mapped to the sentence response, such as "cause the avatar to look here," "point with finger here," "carry 3D object from location X to location Y," "rotate 3D object by N degrees" etc. For example, the animation mapping module can generate an animation sequence for the step by step actions to be carried about by the avatar for manipulating a 3D object within the virtual environment (e.g., handling and moving a product around, such as an air purifier, etc.).

For example, the animation mapping module can perform mapping based on a predefined set of rules.

Then, the output generated by the animation mapping module can be supplied to an audio to conversational gesture model, which can generate low level movements or micro movements for the avatar (e.g., "rotate head where eyes are looking," "gesture with hands," "move head from point A to point B," "wiggle fingers," etc.) which can be combined with the high level movement instructions. The audio to conversational gesture model can synchronize the high level movement instructions for manipulating a 3D object (e.g., servicing an air purifier) with the low level or micro movements (e.g., hand gestures, eye movements, etc.)

With reference again to FIG. 4, upon receiving the audio sentence from the audio buffering module, the audio to facial animation model can generate facial movements based on the audio sentence. For example, the facial animation module can generate instructions for how the avatar should move the mouth, lips, cheeks and other facial controllable parameters.

Then, once the outputs are generated from the audio to facial animation model and the audio to conversational gesture model, the server can transmit blend shape weights, gesture instructions, high level movement/3D object manipulation instructions, and the audio response signal to the avatar.

For example, blendshape weights are numerical values that determine how much each predefined facial deformation, like a smile or frown, contributes to a digital avatar's expression. By adjusting these weights, multiple blendshapes can be combined to create a vast range of unique and nuanced expressions. The weights can act as a blending tool, allowing for smooth transitions between different emotions and adding a layer of realism to the digital avatar's face.

In more detail, the audio to facial animation module can address the issue of retargeting by predicting vertex offsets directly. For example, the audio to facial animation module can work seamlessly with any provided template mesh sharing a same topology used during training of the audio to facial animation module, and the animation can be generated without requiring additional manual retargeting. During the training phase, audio-to-face movement pairs can be utilized along with a face mesh that matches the topology used for reconstruction.

According to an embodiment, the audio to facial animation module can employ a transformer based architecture to autoregressively predict the vertex offsets of the face mesh based on the audio input and a template mesh. In contrast to existing models (e.g., such as faceformer), the last layer of the transformer in the audio to facial animation module can use a linear layer without bias (e.g., a 128-dimensional linear layer without bias), which can improve the audio to facial animation module's compatibility with game engines for exportability.

In addition, in order to accelerate the inference time of the audio to facial animation module, the ALiBi self-attention mechanism can be removed. For example, by removing the ALiBi self-attention mechanism, inference speed can be increased without affecting the animation outcome. Further, in order to shorten wait time for the user, the input to the audio to facial animation module can be a single audio sentence. Also, the audio to facial animation module can resolve issues regarding lip instability when the audio input is silent.

In addition, the audio to facial animation module is pretrained, which can eliminate the need to collect user audio data for retraining in order to generate the face animation. Since the audio to facial animation module already handles the required topology, reconstruction and face animations can be integrated together and manual retargeting becomes unnecessary. In other words, the digital avatar system can automatically generate responses and the corresponding facial movements for the avatar to speak, directly from an audio signal.

Upon receiving the facial instructions, gesture instructions (e.g., hand movements), high level movement/3D object manipulation instructions and the audio response from the server, then avatar can carry out the combined animation/audio sequence and speak the audio response while manipulating a 3D object within the surrounding virtual environment to answer the user's query. This process can be iteratively repeated in order to carry out an ongoing conversation between the user and the digital avatar.

Figure 5:
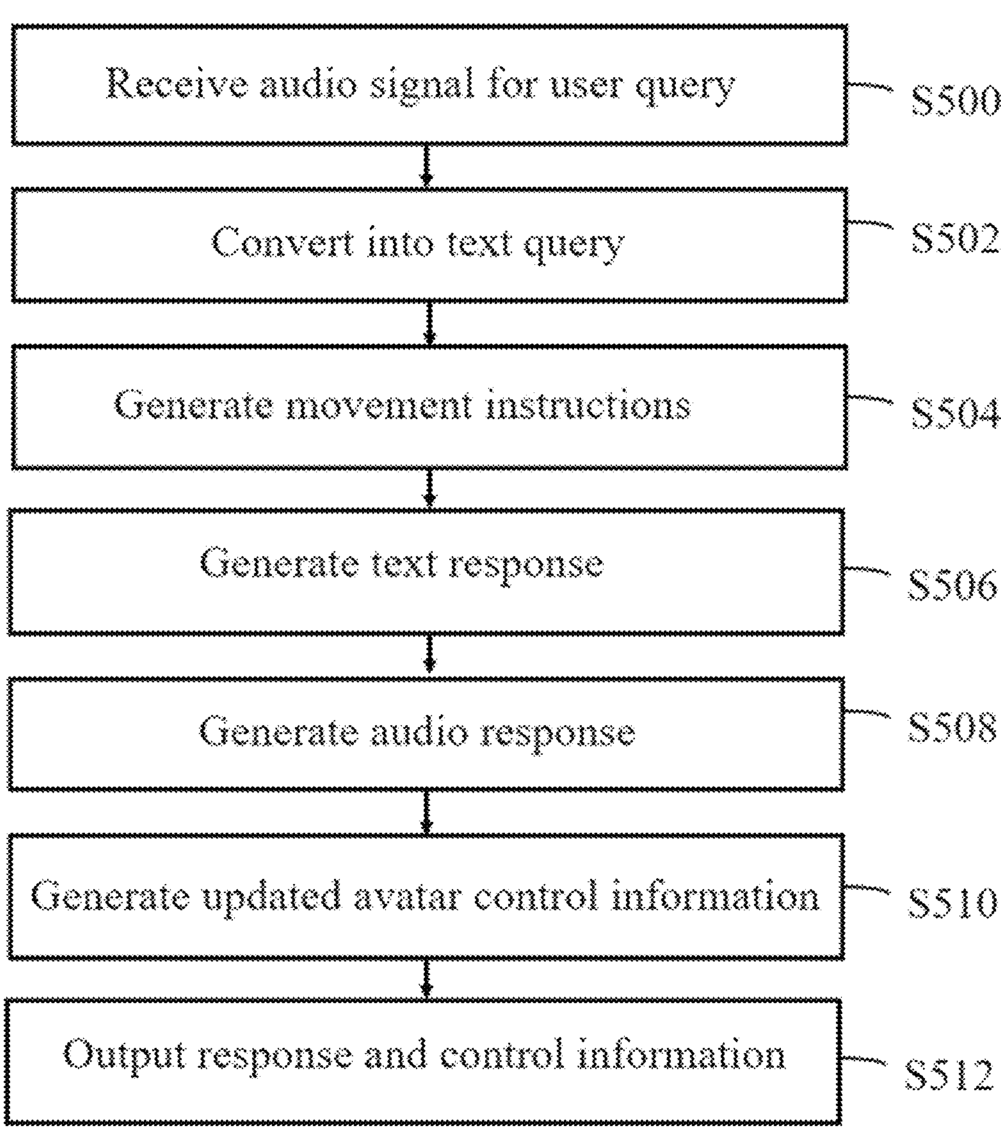
FIG. 5 shows an example flow chart for a method in the AI device, according to an embodiment of the present disclosure.

FIG. 5 shows an example flow chart of a method according to an embodiment of the present disclosure. For example, a method for controlling an artificial intelligence (AI) device for implementing a digital avatar can include receiving an audio signal corresponding to a user query (e.g., S500), converting, by a speech-to-text neural network model, the audio signal into a text query (e.g., S502), inputting the text query into a large language gesture instruction model to generate high level movement instructions (e.g., S504), inputting the text query and the high level movement instructions into an information retrieval model to generate a text response including at least one sentence and digital avatar control information (e.g., S506), inputting the text response into a text-to-speech neural network model to generate an audio response (e.g., S508), inputting the audio response into an audio-to-facial animation model and an audio-to-conversational gesture model to generate updated digital avatar control information including gesture information (e.g., S510), and outputting the audio response and the updated digital avatar control information for controlling the digital avatar (e.g., S512).

Figure 6:
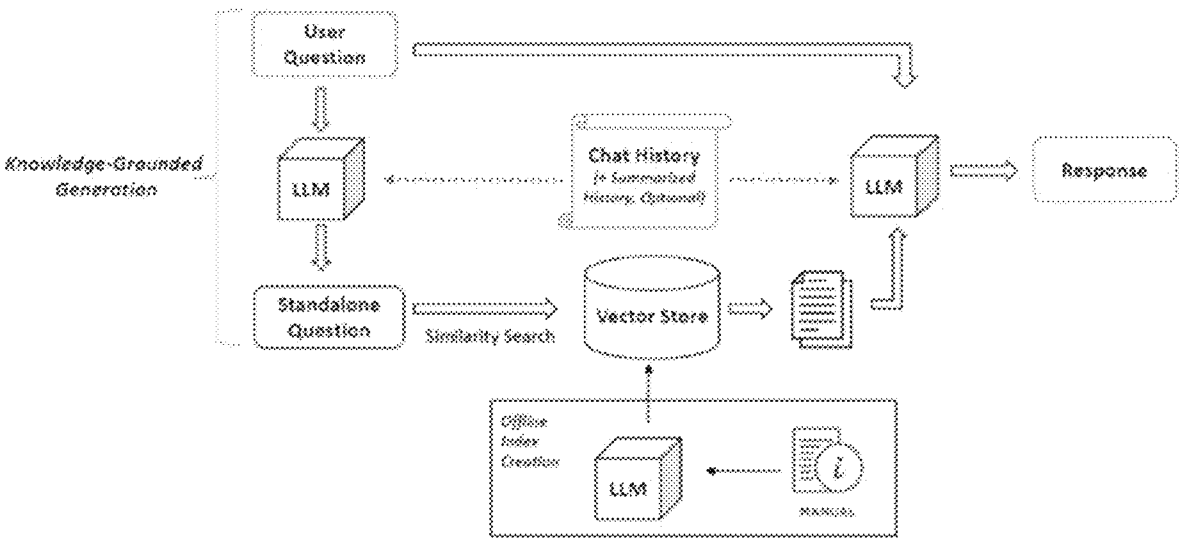
FIG. 6 illustrates an overview of an information retrieval model for a digital avatar assistant in more detail, according to an embodiment of the present disclosure.

FIG. 6 illustrates an overview of an information retrieval model (e.g., from FIG. 4) for a digital avatar assistant in more detail, according to an embodiment of the present disclosure. The various components within the information retrieval model can also be collectively referred to as a retrieval augmented generation model (e.g., RAG model). The information retrieval model can be viewed as having two main components, e.g., a knowledge-grounded generation component (upper part of FIG. 6) and an offline index creation component (e.g., lower part of FIG. 6).

According to an embodiment, the information retrieval model can receive the text (e.g., corresponding to the user's query from the speech-to-text neural network model or a text message from the user) and the gesture instructions from the large language gesture instruction model. The information retrieval model can supply the text corresponding to the user's query to both of a contextualizer large language model (e.g., question rewriter LLM) and a retrieval augmented large language model.

The contextualizer large language model (e.g., the LLM cube at the left in FIG. 6) can receive as inputs the original user query and the previous chat history corresponding the user's earlier conversations with the digital avatar, based on these inputs, the contextualizer large language model can rewrite the original user question into an updated standalone question. The updated standalone question can resolve any discrepancies or ambiguities based on the context of the prior chat history.

For example, the contextualizer large language model can receive a user question and transform it into a self-contained question to aid more accurate information retrieval from a database, e.g., a vector store database. For instance, the original user question of "how often should I clean it?" can be translated by the contextualizer large language model into "how often should I clean the air filter?" in accordance with the conversation history through coreference resolution.

According to embodiment, the contextualizer large language model can use various LLM API's, such as GPT-3.5-turbo, to perform question rewriting based on both the original user question and the conversation history. For example, the contextualizer large language model can be based on a transformer architecture with a self-attention mechanism for weighting different words, and be trained on massive datasets to predict words. Also, the contextualizer LLM can employ decoding strategies to generate text and use techniques such as tokenization and positional encoding to understand the structure of language, and layer normalization and residual connections can also be incorporated to enhance training and performance.

For example, despite the power of LLMs, they may be limited to information available during training and remain unaware of new information introduced post-training. According to an embodiment, the digital avatar system can use an LLM for answering questions about documents it was not trained on by supplying the relevant information from those documents to the LLM during interference time, discussed in more detail below.

Figure 7:
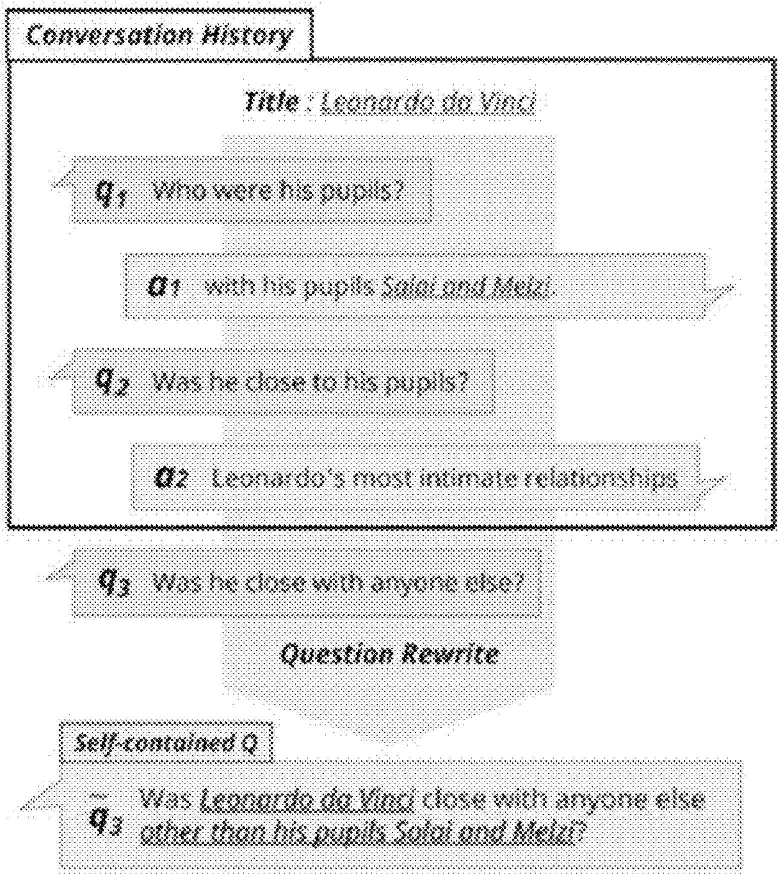
FIG. 7 shows an example of question rewriting, according to an embodiment of the present disclosure.

FIG. 7 shows an example of question rewriting that can be performed by the contextualizer large language model.

For example, due to certain linguistic phenomena in human conversations, such as anaphora and ellipsis, a current question q3 should be understood based on the prior conversation history. The contextualizer large language model can receive question q3 from the user which states "was he close with anyone else?" and use the prior conversation history including q1, a1, q2, and a2 to fill-in the blanks or resolve any ambiguities, in order to rewrite the question q3 as a standalone question $\tilde{q}3$ which states "was Leonardo da Vinci close with anyone else other than his pupils Salai and Melzi?" In this way, the standalone question can be used to search the vector store database to retrieve more relevant evidence documents.

With reference again to FIG. 6, the generated standalone question can be used to retrieve documents from the index that are relevant to the self-contained standalone question. According to embodiments, strategies such as index quantization can be used to reduce the index size and decrease retrieval latency.

Also, according to an embodiment, the vector store can be a database that includes embeddings. For example, each embedding can be created by text-embedding-ada-002 having 1,536 dimensions, and the context window size can be 8,192, but embodiments are not limited thereto. According to embodiments, any type of search can be performed on any type of database storing the evidence documents. For example, the database can include question and answer pairs, topic and description pairs, etc.

According to an embodiment, the vector store database can be based on offline index creation. For example, to enable the retrieval augmented large language model (e.g., LLM cube on the right in FIG. 6) to interact with domain-specific data, the evidence data can be processed to establish an index that facilitates efficient information retrieval. Vector store is one example that can be used for such information retrieval, but embodiments are not limited thereto.

For example, the digital avatar system can use a database for storing and retrieving information based on semantic meaning. The evidence data can be converted into numerical vectors (e.g., embeddings), which capture the meaning or essence of the content. The embeddings can be stored in a way that allows for efficient similarity searches. For example, in response to receiving the standalone question, it can be converted into an embedding, and the vector store can find the most relevant items by comparing their embeddings, which can enable fast and accurate information retrieval based on the conceptual understanding, rather than just keywords.

In more detail, with reference to the lower part in FIG. 6, the process of creating the offline index can include loading documents (e.g., product manuals, etc.), which can be in PDF or HTML format, splitting the documents into multiple segments, generating embeddings for each segment using an encoder, and storing the documents and their corresponding embeddings in a vector store.

For example, according to an embodiment, an entire product manual can be divided into discrete segments, with no overlap between the segments. Each of the segments can be limited to no more than a predetermined number of tokens, e.g., 1000 tokens, but embodiments are not limited thereto. The individual segments from the product manual can then be encoded (e.g., via text-embedding-ada-002 model), but embodiments are not limited thereto and other embedding encoders can be used according to design considerations. Also, to further expedite passage retrieval, the index can be stored with FAISS, but embodiments are not limited thereto.

With reference again to the knowledge-grounded generation component of the information retrieval model (e.g., upper part of FIG. 6), a similarity search can be carried out for the standalone question (e.g., rewritten question) using the index database (e.g., vector store) and the most relevant documents can be retrieved from the index. For example, the top K results can be retrieved from the index, which can include K question and answer pairs, K topic and answer pairs, etc., where K can equal a predetermined result return number, e.g., 5, 10, or 100, etc.

Figure 8:
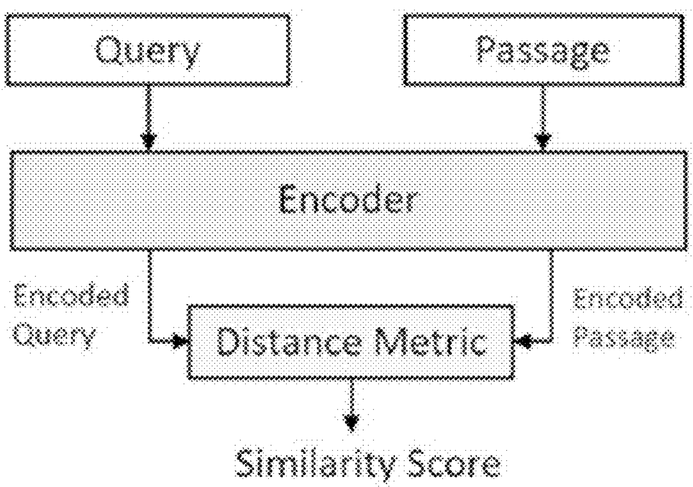
FIG. 8 illustrates an example of a retriever, according to an embodiment of the present disclosure.

FIG. 8 shows an example of a retriever that can be used for a similarity search in more detail, according to an embodiment. According to embodiments, the digital avatar system can use a spare retriever or a dense retriever. BM25 is an example of a sparse retriever. In BM25, passages are represented as a bag of words, and the ranking function is based on term and inverse document frequencies. As another example, a dense passage retriever (DPR) can be used, which operates as a dense retriever, in which passages and questions are encoded as dense representations, which can be computed with two BERT networks (or a single shared one). The ranking function can be the dot product of the query and passage representations. Also, a retriever model can be composed of an embedder function E that maps any text passage to a d-dimensional vector. Also, the similarity score between a question q and a passage p can be defined as Equation 1 below.

$$S_\theta(q,p)=\frac{E(q)^T E(p)}{\sqrt{d}} \quad \text{[Equation 1]}$$

An example overview of the DPR architecture is shown in FIG. 8, and retrieval can be performed using approximate nearest neighbors with the FAISS library. However, embodiments are not limited thereto, and other types of search algorithms can be used to retrieve relevant documents from the database.

Then, the retrieval augmented LLM can receive, as inputs, the relevant documents retrieved from the index, the prior conversation history (e.g., chat history), and the original user question as a combined prompt. In other words, a combined prompt can be generated for the retrieval augmented LLM that is based on at least three items including the original user question, the conversation history, and any relevant documents (e.g., relevant portions retrieved from a user produce manual). Using the combined prompt, the retrieval augmented LLM can generate a response.

According to another embodiment, the retrieval augmented LLM can use a combined prompt based on the rewritten standalone question, the conversation history, and the relevant documents. However, meaning of the rewritten standalone question may not align with the user's original question. Thus, according to a preferred embodiment, the retrieval augmented LLM uses a prompt based on original user question, the conversation history, and relevant documents, in order to enhance the digital avatar's system's robustness and coherence of the generated response.

According to a preferred embodiment, the retrieval augmented LLM can receive, as inputs, the relevant documents retrieved from the index, the prior conversation history (e.g., chat history), the original user question, and movement instructions output by the large language gesture instruction generation model as a combined prompt (e.g., see FIG. 4). In other words, a combined prompt can be generated for the retrieval augmented LLM that is based on at least four items including the original user question, the conversation history, the relevant documents (e.g., relevant portions retrieved from a user produce manual), and movement instructions output by the large language gesture instruction generation model. Using the combined prompt, the retrieval augmented LLM can generate a response that includes an audio response and movement instructions (e.g., gestures, 3D object manipulation instructions).

The retrieval augmented LLM can be based on various LLM API's, such as GPT-3.5-turbo, but embodiments are not limited thereto.

Also, the output response generated by the retrieval augmented LLM can be transmitted as a series of tokens to the text sentence buffering module, as discussed above with reference to FIG. 4.

FIG. 9 shows an example output of the digital avatar system which can be used to animate the digital avatar, according to an embodiment of the present disclosure.

For example, as shown in FIG. 9, a user can present a question to the digital avatar asking a question such as, "How frequently do I need to clean the filter of my air purifier." In response, the digital avatar can provide a generated response based on relevant information from the air purifier manual, and the generated response script can be output as audio speech by the digital avatar and the digital avatar can be animated with gestures and facial movements to correspond to the audio as the avatar speaks the audio response while providing step by step movement actions as a demonstration to the user.

Figure 10:
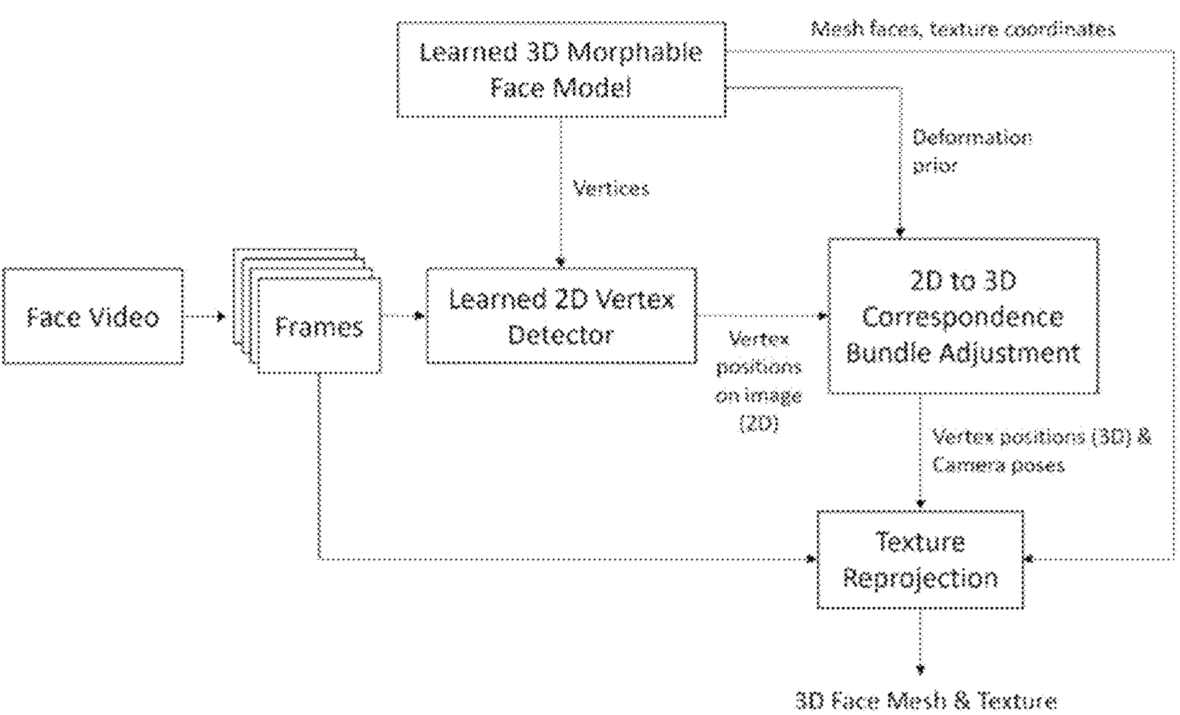
FIG. 10 illustrates an example of a face reconstruction pipeline, according to an embodiment of the present disclosure.

FIG. 10 shows an example of a face reconstruction pipeline (e.g., face reconstruction model), according to an embodiment of the present disclosure. For example, according to an embodiment, a user can have the option to select from among a plurality of pre-made digital avatars or create their own. The face reconstruction pipeline can be located on the client device or the server, but embodiments are not limited thereto. For example, one or more components of the face reconstruction pipeline can be distributed among the client device and the server device.

When a user decides to create their own personalized digital avatar, the system can prompt the user to provide a short video that captures his or her face from left to right, e.g., about a 10 second video including a 360 degree view rotating around the user's head. For example, the user can use a camera application within a smart phone to capture the video and the video can be sent to a server which can include the face reconstruction model. Once the face mesh is generated, the face mesh can be sent to the user's edge device, such as a smart TV or mobile phone. Then, the user can engage in conversations with their personalized digital avatar.

In more detail, the face reconstruction model can address the challenge of generating high-quality avatars from low-quality 2D videos. By leveraging a learned 3D morphable model, the face reconstruction model can achieve realistic face and head reconstructions without requiring any manual intervention. For example, the 3D morphable model can serve as a template, capturing the shape and appearance variations of human heads.

In addition, to reconstruct the face and head from the input video, the face reconstruction model can process each frame individually. A learned vertex detector can be employed to accurately locate the 2D positions of visible vertices in the video frames, allowing for precise correspondence matching. Through bundle adjustment, a process that optimizes the camera poses and head mesh, the face reconstruction model can ensure consistency between the 3D model and the 2D observations.

Also, according to an embodiment, the bundle adjustment procedure can exploit the 3D morphable model as a deformation prior, enabling the face reconstruction model to refine the camera poses and reconstruct the head mesh accurately. By incorporating the 2D correspondences obtained from the learned 2D vertex detector, the face reconstruction model can align the observed vertices with their corresponding 3D positions.

In this way, the face reconstruction model can provide advantages with its simplicity and ease of use. By eliminating the need for manual input to match positions on the mesh with positions on the images, the face reconstruction model offers a streamlined and efficient user experience. Furthermore, the face reconstruction model demonstrates robust performance even with low-quality 2D video inputs, making it applicable to a wide range of scenarios, including real-time applications and virtual reality environments.

Also, the face reconstruction model can generate high-quality avatars from low-quality 2D videos. By leveraging a learned 3D morphable model, the face reconstruction model can achieve accurate reconstructions without the need for manual intervention, providing a simplified and efficient solution for various applications in the fields of animation, gaming, virtual reality, and more.

In more detail, as shown in FIG. 10, the face reconstruction model can receive a short video, e.g., about a 10 second video including a 360 view rotating around the user's head, and process each frame individually. The processed image frames can be provided to a learned 2D Vertex detector and a texture reprojection module.

The learned 2D Vertex detector can receive as inputs, processed image frames and a changeable face model including vertices.

In addition, the learned 2D Vertex detector can include a Convolutional Neural Network (CNN) to extract features from input images, a vertex prediction component that identifies potential vertex locations, a scoring mechanism that evaluates the likelihood of each prediction being a true vertex, and a selection process that filters out the best candidates based on their scores and other criteria and provide alignment matching, but embodiments are not limited thereto.

For example, the learned 2D Vertex detector can align the 3D morphable model with the 2D video (e.g., matching model nose to user nose from video frame, eye to eye, etc.), and output vertex positions on the image (2D) and transmit this information to a 2D to 3D correspondence bundle adjustment module.

The 2D to 3D correspondence bundle adjustment module receives as inputs the vertex positions on the image (2D) output by the learned 2D Vertex detector and deformation prior information from the learned 3D morphable model, which can include deformation prior information of how the face model should move and contract based on a set of rules (e.g., including vectors of numbers).

For example, the deformation prior information in for the 3D morphable face model can guide how the model represents plausible facial deformations. This information can include statistical shape models (e.g., mean face shape and principal components), anatomical constraints (e.g., rules and functions based on facial anatomy), expression models (e.g., blendshapes representing specific expressions), and learned deformation priors (e.g., complex deformation patterns).

The vertex positions on the image (2D) from the learned 2D Vertex detector and deformation prior information from the learned 3D morphable model can be used an inputs to the 2D to 3D correspondence bundle adjustment module, and the 2D to 3D correspondence bundle adjustment module can out vertex positions (3D) and camera poses to the texture reprojection module, which can include an image with vertices and x, y coordinate information with a 2D representation of those vertices.

Based on the inputs including the original processed image frames, vertex positions (3D) and camera poses information from the 2D to 3D correspondence bundle adjustment module, and mesh faces and texture coordinates from the 3D morphable face model, the texture projection module can output a 3D face mesh and texture information, which can include an image having a texture map specifying the color of each face to vertex on the mesh.

For example, the different colors can be specified for each frame for every vertex on the 3D mesh. The output 3D mesh and texture information can be sent to the client device for controlling the digital avatar's face during an animation.

In this way, a personalized high-quality avatar can be automatically generated from a short, low-quality 2D video.

According to an embodiment, an AI device implementing a digital avatar can enhance 3D interaction with the environment via revolutionizing user interactivity by introducing both 3D interaction and 3D visual performative instruction capabilities. These features allow users to better engage with and understand the digital environment. The 3D interaction enables deeper user interaction to explore, manipulate, and navigate the virtual world, such as interact with the digital environment and products/objects within it. Through the conversion of textual instructions into intuitive 3D visual performative instructions, the digital avatar can demonstrate sequential instructions by performing the actions in a step-by-step manner. For instance, users can effortlessly learn how to operate or maintain a machine by following the digital avatar's precise movements and interactions with the machine. This relieves the mental load on the user by eliminating the need to mentally translate textual instructions into spatial actions. Also, this reduces the potential for errors and enhances overall user experience. Furthermore, the user can adjust the camera view within the 3D environment as needed, providing the user with direct visual understanding from different angles.

According to an embodiment, an AI device implementing a digital avatar can introduce natural gesture generation by using a generative adversarial network (GAN) to enable digital avatars to generate natural gestures. This advancement can ensure that users can express themselves intuitively through their avatars, bringing a more authentic and engaging experience to virtual interactions.

Also, according to an embodiment, an AI device implementing a digital avatar can overcome limitations in 3D Facial reconstruction by leveraging a reconstruction algorithm using morphable models, which addresses the existing limitations in reconstructing highly realistic 3D faces. Users can enjoy more photorealistic representations of themselves by just using a regular 3D handheld phone camera or webcam.

According to an embodiment, an AI device implementing a digital avatar can automatically animate facial expressions directly from audio data through advanced machine learning and audio analysis, which enables the synthesis of realistic facial expressions directly from audio input. In this way, avatars can dynamically respond to spoken words or sounds, capturing subtle nuances and emotions to create a more compelling and lifelike virtual experience.

In addition, according to an embodiment, an AI device implementing a digital avatar can empower domain-specific conversations, which can cater to specific industries or areas of expertise. By leveraging domain-specific knowledge, the digital avatar system can engage in meaningful and contextually relevant conversations, providing users with accurate information and valuable insights tailored to their specific needs.

According to an embodiment, the AI device 100 implementing a digital avatar can be configured to answer user queries and/or recommend items (e.g., home appliance devices, mobile electronic devices, movies, content, advertisements or display devices, etc.). The AI device 100 can be used in various types of different situations.

According to one or more embodiments of the present disclosure, the AI device 100 can solve one or more technological problems in the existing technology regarding a digital avatar, such as enhancing 3D interaction with the environment, providing natural gesture generation, overcoming limitations in 3D facial reconstruction, animating facial expressions directly from audio data, and empowering domain-specific conversations.

Various aspects of the embodiments described herein can be implemented in a computer-readable medium using, for example, software, hardware, or some combination thereof. For example, the embodiments described herein can be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions can be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

Furthermore, although some aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, Perl, PHP, HTML, or other programming languages. One or more of such software sections or modules can be integrated into a computer system, computer-readable media, or existing communications software.

Although the present disclosure has been described in detail with reference to the representative embodiments, it will be apparent that a person having ordinary skill in the art can carry out various deformations and modifications for the embodiments described as above within the scope without departing from the present disclosure. Therefore, the scope of the present disclosure should not be limited to the aforementioned embodiments, and should be determined by all deformations or modifications derived from the following claims and the equivalent thereof.

What is claimed is:

1. A method for controlling an artificial intelligence (AI) device for implementing a digital avatar, the method comprising:

receiving, by a processor in the AI device, an audio signal corresponding to a user query;

converting, by a speech-to-text neural network model, the audio signal into a text query;

inputting the text query into a large language gesture instruction model to generate high level movement instructions for controlling a digital avatar to move or manipulate a 3D object;

inputting the text query and the high level movement instructions into an information retrieval model to generate a text response including at least one sentence and digital avatar control information based on the high level movement instructions;

inputting the text response into a text-to-speech neural network model to generate an audio response corresponding to the at least one sentence;

inputting the audio response into an audio-to-facial animation model and an audio-to-conversational gesture model to generate updated digital avatar control information including gesture information; and outputting the audio response and the updated digital avatar control information for controlling the digital avatar.

2. The method of claim 1, wherein the updated digital avatar control information includes the high level movement instructions, hand gestures, and blendshape weights for animating a face of the digital avatar.

3. The method of claim 1, further comprising:

displaying the digital avatar on a display; and moving the digital avatar to carry out an animation sequence based on the updated digital avatar control information in synchronization with audio playback of the audio response.

4. The method of claim 1, further comprising:

retrieving relevant documents based on the text query;

generating an input prompt based on the text query, a prior conversation history between the user and the digital avatar, and the relevant documents; and inputting the input prompt into a retrieval-augmented large language model and outputting the text response by the retrieval-augmented large language model based on the input prompt.

5. The method of claim 1, further comprising:

inputting the text query and a prior conversation history between the user and the digital avatar into a contextualizer large language model, to generate an updated standalone question by replacing at least one word in the text query with at least one word extracted from the prior conversation history.

6. The method of claim 5, further comprising:

performing a similarity search between the updated standalone question and a vector store to retrieve relevant documents from the vector store.

7. The method of claim 6, further comprising:

generating an input prompt based on the text query, the prior conversation history, and the relevant documents from the vector store; and inputting the input prompt into a retrieval-augmented large language model and outputting the text response by the retrieval-augmented large language model based on the input prompt.

8. The method of claim 6, further comprising:

receiving one or more documents;

dividing the one or more documents into a plurality of segments;

generating embeddings for the plurality of segments using an encoder; and storing the one or more documents and the embeddings in the vector store for creating a searchable index.

9. The method of claim 8, wherein the one or more documents include a product manual, an instruction manual or a user manual.

10. The method of claim 1, further comprising:

receiving a video including a face of the user;

generating a 3D face mesh based on the video and a learned 3D morphable face model; and animating a face of the digital avatar based on the 3D face mesh.

11. The method of claim 10, wherein the generating the 3D face mesh includes aligning parts of the learned 3D morphable face model with parts of frame images from the video.

12. An artificial intelligence (AI) device for implementing a digital avatar, the AI device comprising:

a memory configured to store information for controlling a digital avatar; and a controller configured to:

receive an audio signal corresponding to a user query, convert, by a speech-to-text neural network model, the audio signal into a text query, input the text query into a large language gesture instruction model to generate high level movement instructions for controlling a digital avatar to move or manipulate a 3D object, input the text query and the high level movement instructions into an information retrieval model to generate a text response including at least one sentence and digital avatar control information based on the high level movement instructions, input the text response into a text-to-speech neural network model to generate an audio response corresponding to the at least one sentence, input the audio response into an audio-to-facial animation model and an audio-to-conversational gesture model to generate updated digital avatar control information including gesture information, and output the audio response and the updated digital avatar control information for controlling the digital avatar.

13. The AI device of claim 12, wherein the updated digital avatar control information includes the high level movement instructions, hand gestures, and blendshape weights for animating a face of the digital avatar.

14. The AI device of claim 12, wherein the controller is further configured to:

display the digital avatar on a display, and move the digital avatar to carry out an animation sequence based on the updated digital avatar control information in synchronization with audio playback of the audio response.

15. The AI device of claim 12, wherein the controller is further configured to:

retrieve relevant documents based on the text query, generate an input prompt based on the text query, a prior conversation history between the user and the digital avatar, and the relevant documents, and input the input prompt into a retrieval-augmented large language model and output the text response by the retrieval-augmented large language model based on the input prompt.

16. The AI device of claim 12, wherein the controller is further configured to:

perform a similarity search between an updated stand-alone question and a vector store to retrieve relevant documents from the vector store.

17. The AI device of claim 16, wherein the controller is further configured to:

generate an input prompt based on the text query, the prior conversation history, and the relevant documents from the vector store, and input the input prompt into a retrieval-augmented large language model and output the text response by the retrieval-augmented large language model based on the input prompt.

18. The AI device of claim 16, wherein the controller is further configured to:

receive one or more documents, divide the one or more documents into a plurality of segments, generate embeddings for the plurality of segments using an encoder, and store the one or more documents and the embeddings in the vector store for creating a searchable index.

19. The AI device of claim 18, wherein the one or more documents include a product manual, an instruction manual or a user manual.

20. The AI device of claim 12, wherein the controller is further configured to:

receive a video including a face of the user, generate a 3D face mesh based on the video and a learned 3D morphable face model, and animate a face of the digital avatar based on the 3D face mesh.

* * * * *